Sept. 19, 1961 R. H. LUNN 3,000,772
LIGHTWEIGHT NONMETALLIC ARMOR
Filed Nov. 30, 1956
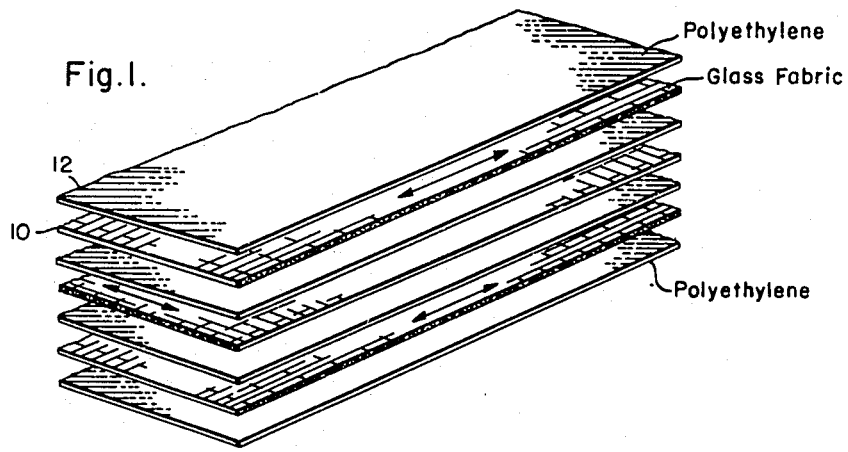
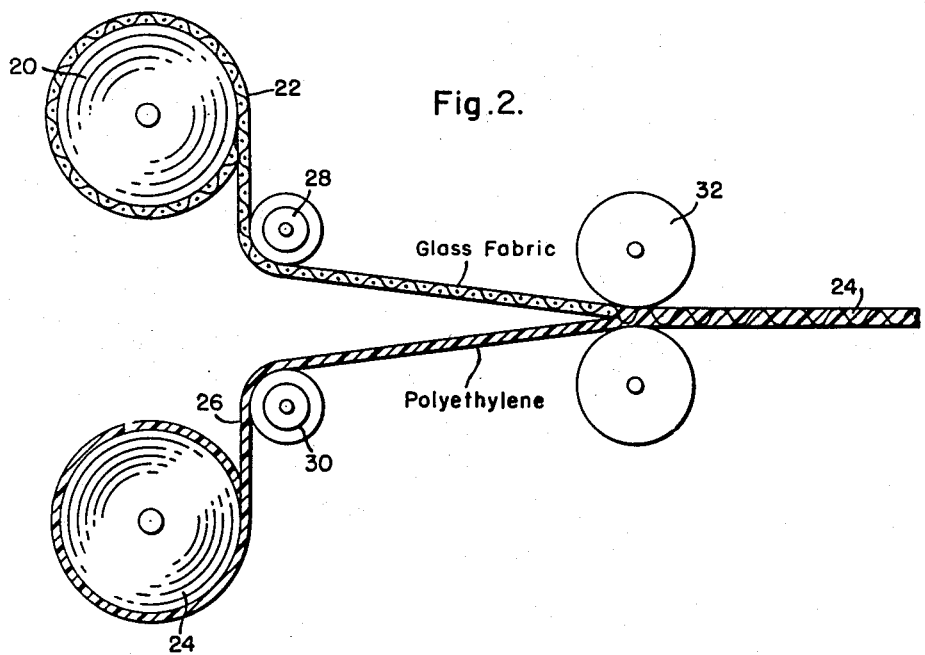
WITNESSES
INVENTOR
Richard H. Lunn
BY
ATTORNEY

United States Patent Office 3,000,772
Patented Sept. 19, 1961

3,000,772
LIGHTWEIGHT NONMETALLIC ARMOR
Richard H. Lunn, Hampton, S.C., assignor to Westinghouse Electric Corporation, East Pittsburgh, Pa., a corporation of Pennsylvania
Filed Nov. 30, 1956, Ser. No. 625,287
5 Claims. (Cl. 154—52.5)

This invention relates to lightweight nonmetallic armor, and more particularly to a tough, lightweight resinous laminate embodying glass fabric suitable for protection of an individual against injury from projectiles and shell fragments.

It is well established that the ballistic performance of glass fabric laminate armor depends in great part on its ability to delaminate. The glass fabric is the basic material of the laminate and must absorb the energy of a projectile. The stopping power of the glass fabric laminate armor resides in the high strength filaments of the glass fabric and in the relatively low strength of the resinous binder which permits the layers of the glass fibers to readily break away from each other and distribute stresses by slipping over one another.

The glass fabric laminate armor should be light in weight and should be tough and flexible rather than rigid. The shattering and jarring effect of a projectile striking the laminate is much greater in a rigid laminate than in a tough, flexible laminate. Therefore, laminates should comprise a tough resinous material uniting the layers of glass fibers into a relatively flexible member which may be readily formed into suitable shapes for the intended application.

The object of this invention is to provide a tough flexible lightweight laminate suitable for use as armor comprising layers of glass fabric and a matrix of polyethylene resin embedding and bonding together the layers of glass fabric.

Other objects of the invention will, in part, be obvious and will, in part, appear hereinafter. For a better understanding of the nature and objects of the invention, reference should be had to the following detailed description and drawing, in which:

FIGURE 1 diagrammatically illustrates in a perspective view the arrangement of the layers of the components of the laminate of this invention.

FIG. 2 is a schematic view in elevation showing glass fabric being laminated to polyethylene sheeting.

According to this invention it has been found that a highly satisfactory lightweight and flexible non-metallic armor can be prepared by bonding together sheets of polyethylene resin and sheets of glass fabric. The polyethylene resin embeds each layer of glass fabric to provide a tough, flexible matrix therefor. The polyethylene further provides a bond between each layer of glass fabric, thereby holding the glass fabric in position to engage projectiles and/or shell fragments, or the like. The laminate can be readily shaped to desired configuration in a hot press.

The glass fabric preferably employed in carrying out this invention comprises a warp of parallel continuous filament glass threads or yarns which are closely spaced and held together by filler threads or yarns. The filler threads are spaced from each other a substantial distance to permit stretching of the fabric in a direction perpendicular to the direction of the glass fiber warp threads. Such stretching, if caused by a sidewise pull or by any impact perpendicular to the plane of the cloth, causes the warp threads to ride up on the filler threads. A pull in the direction of the warp will cause little stretching. The filler threads are preferably of glass and are thinner than the warp threads. Other materials, such as cotton, silk, rayon, nylon, or the like, may be employed as the filler threads. Glass fabric of a thickness of from about 5 mils to 10 mils may be employed in carrying out this invention.

Example 1

An example of a suitable glass fabric for carrying out this invention is as follows:

| | |
|---|---|
| Thickness of fabric | 9 mils. |
| Weave | Crowfoot satin. |
| Weight, ounces per square yard | 8.90. |
| Warp yarn construction | 225/3/2.[1] |
| Fill yarn construction | 450/1/2.[2] |
| Warp yarns per inch | 49. |
| Fill yarns per inch | 30. |
| Filament diameter, inch, warp | 0.00028. |
| Filament diameter, inch, fill | 0.00023. |
| Minimum average breaking strength or warp yarn in pounds per inch | 675. |
| Minimum average breaking strength of fill yarn in pounds per inch | 55. |

[1] This signifies two-ply yarn, each ply containing three strands. The figure 225 indicates that 22,500 yards of one strand weighs one pound. Each strand contains 204 filaments.
[2] This signifies two-ply yarn, each ply containing one strand. The figure 450 indicates that 45,000 yards of one strand weighs one pound. Each strand contains 204 filaments.

The glass fabric laminate armor of this invention is characterized by its extreme toughness and flexibility due to polyethylene being employed as the bonding resin. Polyethylene is a polymer of ethylene and has the following generic formula:

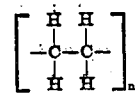

While a great variety of solid polymers of ethylene are suitable for carrying out this invention, it is preferred to employ polymers having an average molecular weight of from 10,000 to 45,000. In some cases, polybutenes may be present in the polyethylene in small amounts of up to 20% by weight. Other resins or powdered fillers and dyes may be present in small amounts.

For the purposes of this invention, the polyethylene is employed in sheet form and in thicknesses of from about 2 mils to 7 mils when being combined with 5 to 10 mil thick glass fabric.

The final laminated structure is prepared by a hot molding operation. Prior to the molding operation sheets of both glass and polyethylene are cut to the desired size and shape and then a stack is built by super-imposing alternate sheets of glass fabric and polyethylene until enough material is so stacked to provide the required final thickness of the laminate after molding.

Referring to FIG. 1 of the drawing there is shown a stacked arrangement of sheets 10 of glass fabric and sheets 12 of polyethylene. This arrangement is accomplished by alternating one sheet with the other. It is to be noted that the bottom and top layers comprise polyethylene sheets 12, and interleaved between each sheet 12 of polyethylene resin is a sheet 10 of glass fabric. As many layers of glass fabric and polyethylene resin as desired may be arranged in this manner. It is important that the top and bottom sheet be of polyethylene resin so that none of the glass fabric will be exposed at the surfaces of the laminate after completion of the molding operation.

It will be further noted in FIG. 1 of the drawing that the layers of glass fabric are so disposed that the warp of each layer is at right angles to the warp of the adjacent layers. The arrows in FIG. 1 of the drawing indicate the direction of the warp. Such an arrangement is referred to as "cross-lamination" and provides greater resistance to penetration.

The glass fabric is somewhat flimsy and awkward to handle in arranging the stack of layers as shown in FIG. 1 of the drawing. It has been found to be highly desirable to initially laminate a sheet of glass fabric to a sheet of polyethylene resin, and then build up the desired number of layers of the laminate from these prepared composite sheets.

To illustrate the preparation of the composite sheets, reference should be made to FIG. 2 of the drawing where there is shown a roll 20 of glass fabric 22 and a roll 24 of polyethylene sheeting 26. The glass fabric 22 passes under roller 28 and the polyethylene sheeting passes over roller 30 and both are brought together and passed between heated spaced laminating rollers 32. The heated rollers soften the polyethylene sheeting and force it into the glass fabric so as to embed the fabric completely in the polyethylene to form a composite sheet 34. A pressure of from about 50 p.s.i. to 200 p.s.i. between rollers 32 while they are at a temperature of from 100° C. to 120° C. will ordinarily be sufficient to cause the polyethylene to soften and be forced into the glass fabric.

The composite sheet 34 is cut into smaller sheets of the desired size and shape. The desired number of sheets are then stacked, aligning successive layers so that the warp of each layer is at right angles to the adjacent layers. A sheet of polyethylene resin alone, of the desired size and shape is placed on either side of the stack prior to molding to insure that no glass fabric will be exposed on the surface of the completed laminate.

The completed stacked assembly is then placed in a compression mold where the assembly can be molded into a flat member or into any desired shape. Heat and pressure are applied for a period of time of from 5 minutes to 15 minutes to bond the stack into a unitary laminate. The heating time required will depend on the thickness of the laminates being molded. Satisfactory pressures are in the range from about 150 to 250 pounds per square inch. Particularly good results are obtained with pressures of from 190 to 210 pounds per square inch at a temperature of from 140° C. to 150° C. during the time the pressure is applied to the stack. After hot molding is completed, pressure is maintained while the press and molded laminate are cooled to a temperature of about 30° C. The laminate is then removed from the press. For most ballistic purposes, each plate should comprise at least 10 layers of glass fabric of from 5 to 10 mils thickness.

The laminates of this invention are usually molded into large flat sheets. However, whether the laminates are initially molded as flat sheets or as shaped members, they can easily be heat formed to any other desired shape or curvature so as to conform to a man's form, the fuselage of an airplane, or the like. Furthermore, it will often be necessary to cut the large sheets of laminate into smaller members for incorporation into body armor and the like. The cutting operation results in rough edges that are undesirable and must be eliminated. This is easily accomplished by drawing the rough edges of the laminate over a hot metal surface to soften or melt the polyethylene and thereby provide a smooth, fused edge surface thereon.

The following examples illustrate the manner in which the laminate of this invention is made:

*Example II*

An assembly was prepared by interleaving twelve 12 inch by 12 inch sheets of the glass fabric of Example I between thirteen 12 inch by 12 inch sheets of 5 mil thick polyethylene. The stack build up resulted in a sheet of polyethylene being on the bottom and on the top of the stack and each sheet of glass fabric was so arranged that the warp was at right angles to the adjacents sheets. The assembly was consolidated for a period of about 15 minutes at 200 pounds per square inch while the temperature was maintained at 140° C. The pressure was then maintained and the press allowed to cool to a temperature of about 30° C. over a period of about 10 minutes. The laminate was then removed.

*Example III*

A second laminate was prepared in the same manner as the laminate of Example II except that 13 sheets of glass fabric were interleaved between 14 sheets of polyethylene film.

*Example IV*

A third laminate was prepared in the same manner as Example II except that 14 sheets of glass fabric were interleaved between 15 sheets of polyethylene film.

The laminates of Examples II, III and IV can be cut into suitable sized pieces and the cut edges smoothened and sealed by passing the edges over a hot metal sheet at 400° F.

The laminates of Examples III and IV were tested by firing a .45 caliber slug into each of them at a distance of 20 feet. The slugs were copper jacketed and weighed 230 grains. None of the slugs penetrated either of the laminates. Nine slugs were then fired into the laminate of Example II, and none of the slugs penetrated the laminate. The laminates exhibit ballistic properties equal to polyester-glass laminates weighing 10% more.

It is important for the purposes of this invention that a sufficient thickness of polyethylene be employed so as to penetrate well into the interstices of the glass fabric during the molding process and also provide a thin film of polyethylene of the order of about 1 mil on the surfaces of the finished laminate thereby preventing bare glass fibers from coming into contact with one another. Bare glass fibers are undesirable as they abrade easily, thereby weakening the ballistic properties of the laminate.

The glass fabric laminate armor of this invention is a tough, flexible laminate having excellent ballistic properties. Owing to the damping quality of polyethylene the laminates of this invention are considerably quieter under conditions where they are moved or struck than laminates of glass fabric reenforced with polyester resins which have been considered the best available previously. There has been considerable objection to the noise created by polyester reenforced glass fabric panels when they bump together in armored jackets during use in combat.

Laminates for use as body armor are usually made in large sheets. It is necessary to cut the large sheets into small panels for incorporation into body armor and the like. The cutting operation results in rough edges that are undesirable and must be eliminated. Polyester reenforced glass fabric requires special sealing compounds to eliminate the rough edges created by the cutting operation. Owing to the thermoplastic property of polyethylene, it is only necessary to apply heat to the rough edges to seal them.

The armor of this invention is very light in weight and is particularly adaptable for body armor; however, it is not limited to this specific application. The laminates of this invention may for instance be employed to clad the floor and/or side walls of an airplane fuselage, and thus protect it against anti-aircraft artillery. Aside from military applications, the laminate has many peace time applications. Thus, it could be employed to shield individuals who are working in the vicinity of explosive materials, reaction vessels, explosive devices and the like.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A tough, flexible laminated member comprising a plurality of alternately crossed layers of fabric comprising a warp of closely packed continuous glass yarn and spaced apart fill yarn, the number and thickness of said glass warp yarns exceeding the number and thickness of said fill yarns and a matrix of tough polyethylene embedding and bonding together the layers of fabric into a unitary member, the bond between the layers of fabric being substantially uniform throughout the member and the member having a desired shape and size.

2. A tough, flexible laminated member comprising a plurality of alternately crossed layers of fabric comprising warp of closely packed continuous glass yarn and spaced fill yarn, the number and thickness of said glass warp yarns exceeding the number and thickness of said fill yarns, a matrix of tough polyethylene embedding and bonding together the layers of fabric into a unitary member, and heat sealed edges to provide thereon a smooth fused surface, the bond between the layers of fabric being substantially uniform throughout the member.

3. A lightweight laminated armor plate capable of delamination under the impact of a projectile, said armor plate comprising a plurality of alternately crossed layers of fabric comprising warp of closely packed continuous glass yarn and spaced fill yarn, the number and thickness of said glass warp yarns exceeding the number and thickness of said fill yarns and a matrix of tough polyethylene embedding and bonding together the layers of fabric into a unitary member, the bond between the layers of fabric being substantially uniform throughout the member and the member being tough and flexible.

4. A lightweight laminated armor plate capable of delamination under the impact of a projectile, said armor plate being a tough, flexible unitary member comprising at least ten alternately crossed layers of fabric of a thickness of from about 5 mils to 10 mils comprising warp of closely packed continuous glass yarn and spaced fill yarn, the number and thickness of said glass warp yarns exceeding the number and thickness of said fill yarns and a matrix of tough polyethylene of a thickness of from about 2 mils to 7 mils embedding and bonding the layers of fabric and providing thereon a thin film of polyethylene of about 1 mil, the bond between the layers of fabric being substantially uniform throughout the member.

5. A lightweight laminated armor plate capable of delamination under the impact of a projectile, said armor plate being a tough, flexible unitary member comprising at least ten alternately crossed layers of fabric of a thickness of from about 5 mils to 10 mils comprising warp of closely packed continuous glass yarn and spaced fill yarn, the number and thickness of said glass warp yarns exceeding the number and thickness of said fill yarns and a matrix of tough polyethylene of a thickness of from about 2 mils to 7 mils embedding and bonding the layers of fabric and providing thereon a thin film of polyethylene of about 1 mil, the edges of the plate being heat fused and the bond between the layers of fabric being substantially uniform throughout the member.

References Cited in the file of this patent

UNITED STATES PATENTS

| | | |
|---|---|---|
| 2,562,951 | Rose et al. | Aug. 7, 1951 |
| 2,642,370 | Parsons et al. | June 16, 1953 |
| 2,650,184 | Biefeld | Aug. 25, 1953 |
| 2,778,761 | Frieder et al. | Jan. 22, 1957 |

FOREIGN PATENTS

| | | |
|---|---|---|
| 1,125,121 | France | July 9, 1956 |